(12) United States Patent
Kumano et al.

(10) Patent No.: US 10,691,959 B2
(45) Date of Patent: Jun. 23, 2020

(54) ESTIMATING APPARATUS

(71) Applicants: SOKEN, INC., Nishio, Aichi-pref. (JP); DENSO CORPORATION

(72) Inventors: Shunya Kumano, Nishio (JP); Shunsuke Suzuki, Kariya (JP); Kenta Hoki, Kariya (JP)

(73) Assignees: SOKEN, INC., Nishio, Aichi-pref. (JP); DENSO CORPORATION, Kariya, Aichi-pref. (JP)

( * ) Notice: Subject to any disclaimer, the term of this patent is extended or adjusted under 35 U.S.C. 154(b) by 216 days.

(21) Appl. No.: 15/871,712

(22) Filed: Jan. 15, 2018

(65) Prior Publication Data
US 2018/0204074 A1    Jul. 19, 2018

(30) Foreign Application Priority Data

Jan. 16, 2017    (JP) .................. 2017-005349

(51) Int. Cl.
*G06K 9/00*    (2006.01)
*G06K 9/46*    (2006.01)
(Continued)

(52) U.S. Cl.
CPC ....... *G06K 9/00798* (2013.01); *G06K 9/4604* (2013.01); *G06K 9/4638* (2013.01);
(Continued)

(58) Field of Classification Search
None
See application file for complete search history.

(56) References Cited

U.S. PATENT DOCUMENTS 6,577,334 B1    6/2003    Kawai et al.
9,988,048 B1 *    6/2018    Song .................. B60W 30/12
(Continued)

FOREIGN PATENT DOCUMENTS

JP    2000-074199    3/2000
JP    2002-312797    10/2002
(Continued)

OTHER PUBLICATIONS

Guangqian Lu, A Lane Detection, Tracking and Recognition System for Smart Vehicles, https://pdfs.semanticscholar.org/cc79/128544bea56790b6d098014d5b5956ed5092.pdf, 2015 (Year: 2015).*
(Continued)

*Primary Examiner* — Andrae S Allison
(74) *Attorney, Agent, or Firm* — Maschoff Brennan

(57) ABSTRACT

In a travelling road estimating apparatus, an estimator estimates, based on the coordinates of at least one of edge points included in a selected candidate, a road parameter using a previously prepared filter having an adjustable response level. The road parameter is associated with a condition of the travelling road relative to the vehicle and a shape of the travelling road. A determiner determines whether there is an unstable situation that causes an accuracy of estimating the edge points by an edge extractor to be reduced. A response level adjuster adjusts the response level of the filter in accordance with determination of whether there is an unstable situation that causes an accuracy of estimating the edge points by the edge extractor to be reduced.

24 Claims, 11 Drawing Sheets

(51) Int. Cl.
*G08G 1/16* (2006.01)
*G06T 7/12* (2017.01)

(52) U.S. Cl.
CPC .............. *G06T 7/12* (2017.01); *G08G 1/167* (2013.01); *G06T 2207/10016* (2013.01); *G06T 2207/10024* (2013.01); *G06T 2207/30256* (2013.01)

(56) References Cited

U.S. PATENT DOCUMENTS

| | | | |
|---|---|---|---|
| 2002/0080019 A1 | 6/2002 | Satoh et al. | |
| 2003/0001732 A1* | 1/2003 | Furusho | G05D 1/0246 340/435 |
| 2005/0209748 A1 | 9/2005 | Watanabe et al. | |
| 2005/0265579 A1* | 12/2005 | Nishida | G06K 9/00798 382/103 |
| 2005/0270374 A1 | 12/2005 | Nishida et al. | |
| 2008/0189012 A1* | 8/2008 | Kaufmann | B62D 1/286 701/41 |
| 2010/0284569 A1* | 11/2010 | Sakurai | G06T 3/00 382/103 |
| 2011/0010021 A1* | 1/2011 | Kobayashi | B60T 8/17557 701/1 |
| 2012/0215377 A1* | 8/2012 | Takemura | B60W 30/12 701/1 |
| 2014/0063251 A1* | 3/2014 | Kim | G08G 1/167 348/148 |
| 2015/0235095 A1 | 8/2015 | Kawasaki et al. | |
| 2015/0248588 A1* | 9/2015 | Ishigami | G06K 9/00798 382/104 |
| 2015/0248763 A1 | 9/2015 | Kumano et al. | |
| 2015/0285614 A1 | 10/2015 | Okada et al. | |
| 2015/0332101 A1* | 11/2015 | Takaki | B60R 1/00 382/104 |
| 2015/0348275 A1 | 12/2015 | Kumano et al. | |
| 2016/0003628 A1 | 1/2016 | Osanai et al. | |
| 2016/0012298 A1* | 1/2016 | Maeda | G06K 9/00798 382/104 |
| 2016/0012299 A1 | 1/2016 | Maeda et al. | |
| 2016/0173831 A1* | 6/2016 | Akamine | G06K 9/00798 348/149 |

FOREIGN PATENT DOCUMENTS

| | | |
|---|---|---|
| JP | 2006-285493 | 10/2006 |
| JP | 2007-164636 | 6/2007 |
| JP | 2007-196851 | 8/2007 |
| JP | 2011-198110 | 10/2011 |
| JP | 2012-022574 | 2/2012 |
| JP | 2013-097738 | 5/2013 |
| JP | 2014-157429 | 8/2014 |
| JP | 2015-079446 | 4/2015 |

OTHER PUBLICATIONS

Ge et al, A Real-Time Lane Detection Algorithm Based on Intelligent CCD Parameters Regulation, Hindawi Publishing Corporation Discrete Dynamics in Nature and Society, vol. 2012, Article ID 273164, 16 pages (Year: 2012).*

Bounini, Farid, et al. "Autonomous vehicle and real time road lanes detection and tracking." 2015 IEEE Vehicle Power and Propulsion Conference (VPPC). IEEE, 2015. (Year: 2015).*

Fernando, Shehan, et al. "Real-time lane detection on suburban streets using visual cue integration." International Journal of Advanced Robotic Systems 11.4 (2014): 61 (Year: 2014).*

* cited by examiner

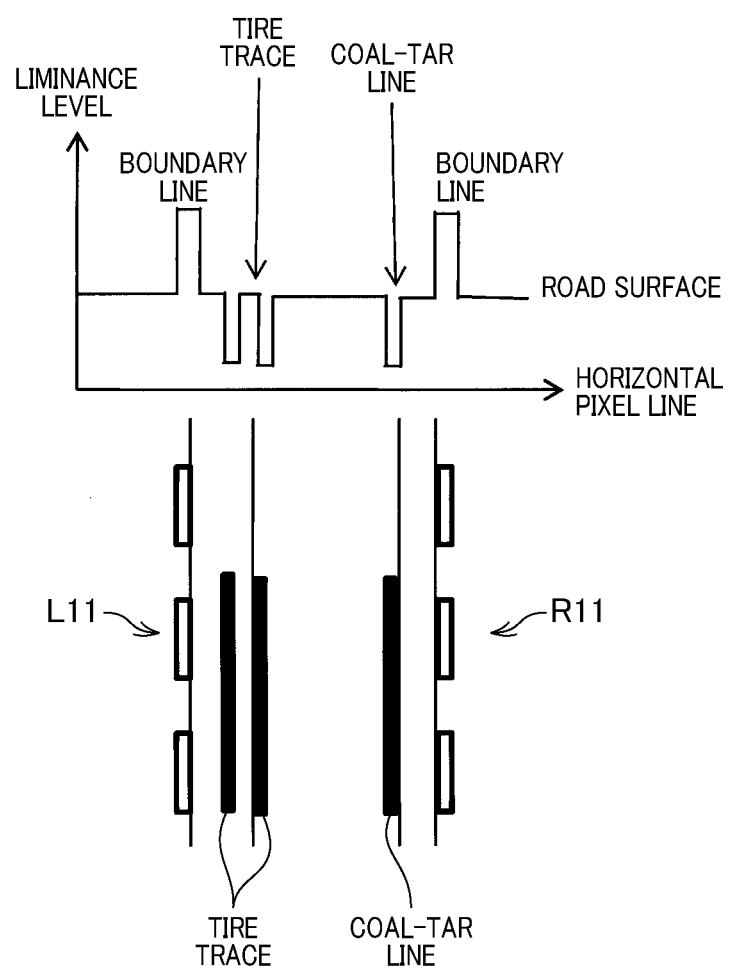

COAL-TAR LINE

LI5

TIRE TRACE

ESTIMATING APPARATUS

CROSS REFERENCE TO RELATED APPLICATION

This application is based on and claims the benefit of priority from Japanese Patent Applications No. 2017-005349 filed on Jan. 16, 2017, the disclosure of which is incorporated in its entirety herein by reference.

TECHNICAL FIELD

The present disclosure relates to technologies for recognizing lane marking lines, i.e. lane boundary lines, from an image.

BACKGROUND

One of conventional technologies extracts edge points in traffic lane lines on a road from an image obtained from a camera installed to a vehicle, and obtains the coordinates of each of the edge points.

Then, the conventional technology inputs the obtained coordinates of each of the edge points as observations of a corresponding one of variables to a previously prepared filter, such as a Kalman filter. Then, the filter estimates state values of a road, such as values of road parameters, which include, for example, a lateral offset position, a yaw angle, and a curvature of the road relative to the travelling direction of the vehicle, i.e. the optical axis of the camera.

The filter has a controllable response to the observations input thereto. For example, the filter sets a level of the response to a higher level upon the vehicle travelling or is about to travel on a curved road to thereby prevent response lag to the input of the observations. In contrast, the filter sets a level of the response to a lower level upon the vehicle travelling on a straight road to thereby prevent the vehicle from zig-zaging.

Japanese patent application publication No. 2006-285493, which will be referred to as a published patent document, discloses the following technology. Specifically, the disclosed technology changes the response of a filter, which is installed in a vehicle, depending on the curvature of the road on which the vehicle is travelling; the curvature is estimated based on a yaw rate of the vehicle observed as an observation.

SUMMARY

As a result of detailed consideration of the published patent document, the inventors of this application have found the following issue. Specifically, changing the response of the filter in accordance with the yaw rate of the vehicle may result in delay of the timing at which a level of the response of the filter is actually changed to a proper level suitable for the environmental circumstances around the vehicle.

Specifically, the yaw rate of the vehicle is measured after the vehicle has entered a curve in a road. For this reason, changing a level of the response of the filter in accordance with the yaw rate of the vehicle may result in delay of the timing at which a level of the response of the filter is actually changed to a proper level suitable for the curve.

For improving the response of the filter upon the vehicle entering a curve in a road, let us consider a measure to set a higher level of the response of the filter upon the vehicle travelling on a straight section of the road before the vehicle entering a curve.

The inventors of this application however have found the following additional issue described hereinafter.

Specifically, if there are faded colors of making lines on a road, cracks on the road, and/or coal-tar repairs on the road, these factors may reduce the extraction accuracy of the edge points. For this reason, the above measure may result in higher response to these lower-accuracy edge points. This may result in reduction in the stability of estimating the state values of the road, causing, for example, lane keeping assist control based on the estimated state values of the road to become unstable.

The present disclosure provides technologies that balance both sufficient response of a previously prepared filter and stable estimation of a travelling road of a vehicle.

According to a first exemplary aspect of the present disclosure, there is provided a travelling road estimating apparatus. The travelling road estimating apparatus includes an edge extractor configured to extract edge points from an image of a travelling road ahead of a vehicle captured by an image capturing unit of the vehicle, and calculate coordinates of each of the edge points, each of the edge points representing an extracted pixel of the image. The extracted pixel has a luminance level higher by at least a predetermined threshold level than a luminance level of at least one of pixels of the image adjacent to the extracted pixel. The travelling road estimating apparatus includes a candidate extractor configured to extract, based on the coordinates of each of the edge points, at least one line candidate that is a candidate of a lane marking line of the travelling road, and a selector configured to select the at least one line candidate as a selected candidate. The travelling road estimating apparatus includes an estimator configured to estimate, based on the coordinates of at least one of the edge points included in the selected candidate, a road parameter using a previously prepared filter having an adjustable response level. The road parameter is associated with a condition of the travelling road relative to the vehicle and a shape of the travelling road. The travelling road estimating apparatus includes a determiner configured to determine whether there is an unstable situation that causes an accuracy of estimating the edge points by the edge extractor to be reduced. The travelling road estimating apparatus includes a response level adjuster configured to adjust the response level of the filter in accordance with determination of whether there is an unstable situation that causes an accuracy of estimating the edge points by the edge extractor to be reduced.

According to a second exemplary aspect of the present disclosure, there is provided a travelling road estimating method. The travelling road estimating method includes extracting edge points from an image of a travelling road ahead of a vehicle captured by an image capturing unit of the vehicle, and calculating coordinates of each of the edge points, each of the edge points representing an extracted pixel of the image. The extracted pixel has a luminance level higher by at least a predetermined threshold level than a luminance level of at least one of pixels of the image adjacent to the extracted pixel. The travelling road estimating method extracts, based on the coordinates of each of the edge points, at least one line candidate that is a candidate of a lane marking line of the travelling road. The travelling road estimating method includes selecting the at least one line candidate as a selected candidate, and estimating, based on the coordinates of at least one of the edge points included in the selected candidate, a road parameter using a previously prepared filter having an adjustable response level. The road parameter is associated with a condition of the travelling road relative to the vehicle and a shape of the travelling road. The travelling road estimating method includes determining whether there is an unstable situation that causes an accuracy of estimating the edge points by the extracting step to be reduced. The travelling road estimating method includes adjusting the response level of the filter in accordance with determination of whether there is an unstable situation that causes an accuracy of estimating the edge points by the edge-point extracting step to be reduced.

Each of the first and second exemplary aspects enables the response level of the filter to be sufficiently maintained until it is determined that there is an unstable situation that causes the accuracy of extracting the edges to be reduced. This configuration ensures the sufficiently maintained response level of the filter independently of whether the vehicle is travelling toward a straight section of a road or a curved section in the road.

BRIEF DESCRIPTION OF THE DRAWINGS

Other aspects of the present disclosure will become apparent from the following description of embodiments with reference to the accompanying drawings in which:

FIG. 7 is a graph schematically illustrating a luminance level distribution of the image on a horizontal pixel line illustrated in FIG. 6B;

DETAILED DESCRIPTION OF EMBODIMENT

The following describes an exemplary embodiment of the present disclosure with reference to the accompanying drawings.

Overall Structure

The following describes an example of the overall structure of a cruise assist system 1 according to the exemplary embodiment.

Figure 1:
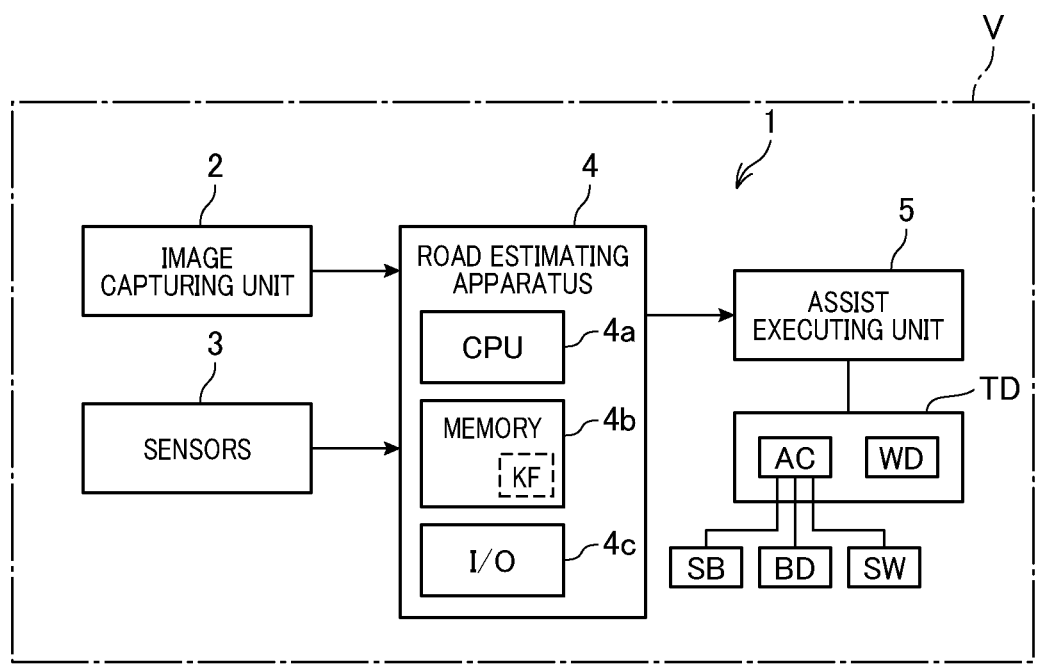
FIG. 1 is a block diagram schematically illustrating an example of the overall structure of a cruise assist system according to an exemplary embodiment of the present disclosure.
Figure 2:
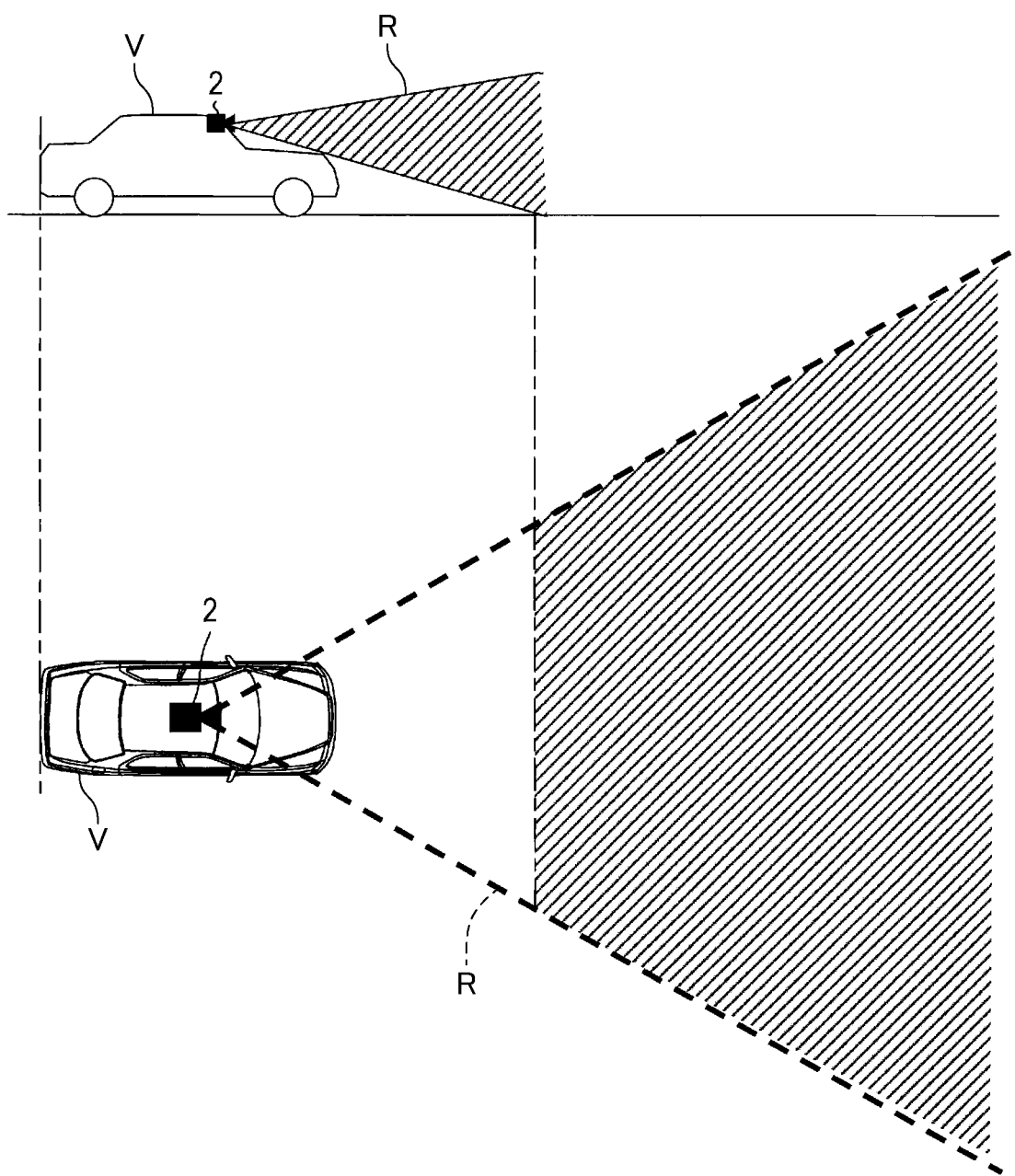
FIG. 2 is a schematic plan and side view of a vehicle illustrated in FIG. 1 for illustrating an imaging region of an image capturing unit illustrated in FIG. 1.

Referring to FIG. 1, the cruise assist system 1 is installed in a vehicle; the vehicle will be referred to as an own vehicle V. The cruise assist system 1 is configured to estimate values of predetermined road parameters from a forward image; the forward image is an image of a forward region of the own vehicle V captured by an image capturing unit 2 described later. Then, the cruise assist system 1 is configured to perform various cruise assist tasks in accordance with the estimated values of the road parameters. The road parameters represent the conditions of a travelling road, such as a travelling course, upon which the own vehicle V is travelling and the shape of the travelling road. The detailed descriptions of the road parameters will be described later.

The cruise assist system 1 includes an image capturing unit 2, sensors 3, a road estimating apparatus 4, and a cruise-assist executing unit 5.

The image capturing unit 2 is installed in the own vehicle V to capture a forward portion of a road on which the own vehicle V is located. The image capturing unit 2 is mounted to, for example, the front side of the top of the own vehicle V. In detail, the image capturing unit 2 is mounted to the center of the front side of the own-vehicle's top in its width direction. The image capturing unit 2 has a predetermined imaging region R that horizontally and vertically expands therefrom in the front direction of the own vehicle V to have a substantially sector or a substantially semi-circular shape in the front direction of the own vehicle V. That is, the image capturing unit 2 captures images of the imaging region R. For example, the image capturing unit 2 is comprised of a CCD camera, a CMOS image sensor, or a near-infrared camera, and configured to capture color images of the imaging region R using a controlled exposure time, i.e. a controlled shatter speed; each of the color images includes a luminance level and color information of each pixel thereof.

The sensors 3 are installed in the own vehicle V and are each configured to measure a corresponding vehicle parameter indicative of the conditions of the own vehicle V and/or the behavior of the own vehicle V. Each of the sensors 3 is also configured to output, to the road estimating apparatus 4, a measurement value of the corresponding vehicle parameter. For example, the sensors 3 include a vehicle speed sensor configured to measure a speed of the own vehicle V as a function of, for example, the rotational speed of each wheel of the own vehicle V.

The sensors 3 can include a yaw-rate sensor that measures an angular velocity, i.e. angular rate, about the vertical direction of the own vehicle V, and a global-positioning-system (GPS) sensor that measures the position of the own vehicle V. The sensors 3 can also include a radar sensor that detects objects located around the own vehicle V using radar waves, and obtains distances from the own vehicle V to the detected objects and relative speeds of the detected objects relative to the own vehicle V.

The road estimating apparatus 4 is centered on a known type of microcomputer, equipped with a CPU 4a and a memory 4b comprised of at least a ROM, a RAM, and/or a semiconductor memory such as a flash memory. The road estimating apparatus 4 also includes an I/O device 4c connected via input ports to the image capturing unit 2 and the sensors 3 and connected via an output port to the cruise-assist executing unit 5. The various functions of the road estimating apparatus 4 are implemented by the CPU 4a in executing programs that are stored in non-transitory storage media. With this embodiment, the memory 4b corresponds to the non-transitory storage media in which the programs are stored. Furthermore, the CPU 4a executes the programs, thus executing methods corresponding to the programs. The road estimating apparatus 4 is not necessarily configured with a single microcomputer, and it would be equally possible to have a plurality of microcomputers.

The road estimating apparatus 4 executes at least a road recognition routine, i.e. a road estimation routine, in accordance with (1) The images captured by the image capturing unit 2 and received therefrom via the corresponding input port of the I/O unit 4c (2) The measurement values of the vehicle parameters measured by the respective sensors 3 and received therefrom via the corresponding input ports of the I/O unit 4c The cruise-assist executing unit 5 is configured to receive a result of the road recognition routine, i.e. an estimated travelling road of the own vehicle V, from the road estimating apparatus 4 and execute, based on the result of the road recognition routine, various cruise-assist control tasks, which includes a lane keeping assist task, to activate various types of controlled target devices TD. For example, the controlled target devices TD include actuators AC and a warning device WD.

The actuators AC include a first actuator for driving a brake device BD installed in the own vehicle V, a second actuator for rotating a steering wheel SW of the own vehicle V for assisting the driver's turning operation of the steering wheel, and a third actuator for tightening a seat belt SB mounted to each seat of the own vehicle V. The warning device WD includes a speaker and/or a display mounted in the compartment of the own vehicle V, and outputs warnings including, for example, warning sounds and/or warning messages for the driver.

Operation

The road estimating apparatus 4 is configured to run corresponding one or more programs to thereby implement a road recognition function.

Figure 3:
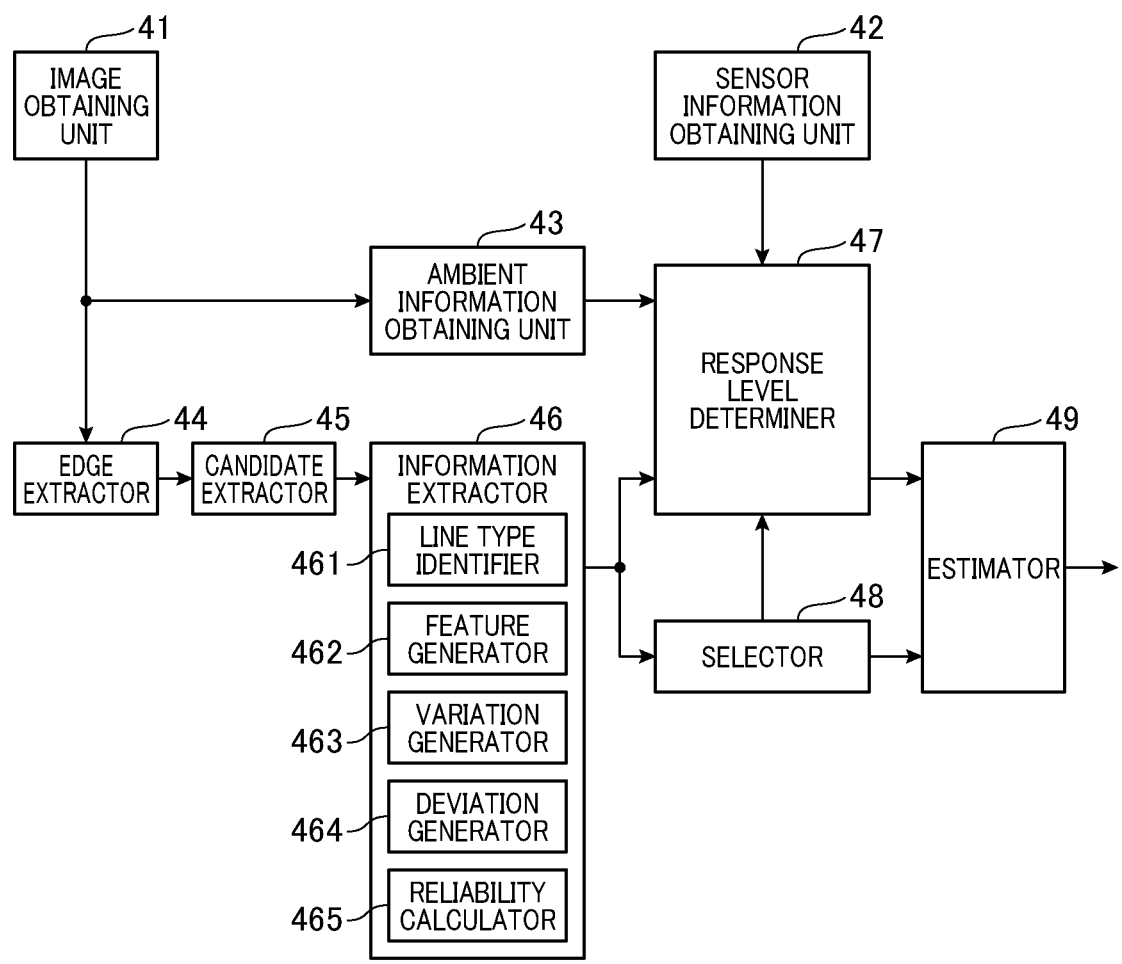
FIG. 3 is a block diagram schematically illustrating a functional structure of a road estimating apparatus illustrated in FIG. 1.

Referring to FIG. 3, the road estimating apparatus 4 includes, as components that implement the road recognition function, an image obtaining unit 41, a sensor information obtaining unit 42, an ambient information obtaining unit 43, an edge extractor 44, a candidate extractor 45, an information extractor 46, a response level determiner 47, a selector 48, and an estimator 49.

The method of implementing the function of each component 41 to 49 is not necessarily limited to be based on software, and it would be equally possible for all or part of the function to be realized by using one or more hardware elements. For example, in a case in which the above functions are realized through use of hardware comprised of electronic circuitry, the electronic circuitry could be implemented as a digital circuit containing a plurality of logic circuits, or as analog circuits, or as a combination of these.

The image obtaining unit 41 obtains a captured image from the image capturing unit 2 in a predetermined cycle; this cycle will be referred to as a processing cycle. In other words, the image capturing unit 2 captures an image, i.e. a forward image, in the processing cycle, and the image obtaining unit 41 obtains the image each time the image is captured by the image capturing unit 2 in the processing cycle.

The sensor information obtaining unit 42 obtains, from the sensors 3, the measurement values of the vehicle parameters measured by the respective sensors 3. In particular, the sensor information obtaining unit 42 according to this embodiment obtains the speed and the yaw rate of the own vehicle V from the corresponding vehicle speed sensor and the yaw-rate sensor.

The ambient information obtaining unit 43 is configured to obtain the luminance level around the road in front of the own vehicle V in each processing cycle, and obtain, as luminance change information, an absolute value of the luminance deviation $\Delta C$, which will be referred to as a luminance deviation $\Delta C$, of the luminance level obtained by the current processing cycle from the luminance level obtained by the last previous processing cycle. For example, the ambient information obtaining unit 43 calculates the average value of the luminance levels of all the pixels of the image obtained by the image obtaining unit 41 in each processing cycle, thus obtaining the average value as the luminance level around the road in front of the own vehicle V. As another example, the ambient information obtaining unit 43 can obtain the luminance level around the road in front of the own vehicle V in each processing cycle using a luminance sensor.

The edge extractor 44 applies a known edge extraction filter, such as a Sobel filter, on the image obtained by the image obtainer 41 to thereby extract edge points from the image. Each edge point represents a corresponding point, i.e. a corresponding pixel, having a luminance level higher by at least a predetermined threshold level than the luminance level of at least one of pixels of the image adjacent to the corresponding pixel.

The candidate extractor 45 is configured to perform, for example, Hough transform of the extracted edge points. The Hough transform is capable of extracting, based on the extracted edge points, line candidates on which some of the edge points are aligned. Each of the line candidates represents a candidate of lines each of which represents a boundary between a corresponding one of marking lines painted on the road and the road surface. The marking lines are painted to show the range of the travelling road on which vehicles can travel.

The selector 48 is configured to select, from the extracted line candidates, a pair of line candidates respectively represents right and left lane boundary lines, i.e. right and left lane marking lines, of the travelling road on which the own vehicle V is travelling. The selected pair of line candidates will be referred to as selected boundary line candidates. For example, the selector 48 can obtain, from the extracted line candidates, the selected boundary line candidates in accordance with various pieces of information extracted from the information extractor 46, which are described later, and/or the information about each of the extracted line candidates.

The estimator 49 is configured to obtain, as observations, coordinates of the edge points constituting each of the selected boundary line candidates, i.e. the selected right and left boundary line candidates. Then, the estimator 49 includes a Kalman filter, i.e. a Kalman filter algorithm, KF stored in the memory 4b, and applies the Kalman filter KF on the observations to thereby calculate the road parameters representing the conditions of the travelling road, upon which the own vehicle V is travelling, relative to the own vehicle V and the shape of the travelling road.

For example, the actual observations (measurements) in the current processing cycle is referred to as $z_k$, a priori state estimate for each road parameter based on a predetermined state estimate model of the travelling road is referred to as $\bar{x}_k$, m×n matrix H relates to the variables of the road state model to the observations $z_k$. A predicted observations $H\bar{x}_k$ based on the priori estimate $\bar{x}_k$ is referred to as $H\bar{x}_k$. A posteriori state estimate for each road parameter is referred to as $\hat{x}_k$.

Then, the posteriori state estimate $\hat{x}_k$ for each road parameter can be expressed by the following equation (1):

$$\hat{x}_k = \bar{x}_k + K(z_k - H\bar{x}_k) \quad (1)$$

Where K is an m×n matrix referred to as Kalman gain.

The estimator 49 outputs the calculated road parameters to the assist executing unit 5.

Figure 4A:
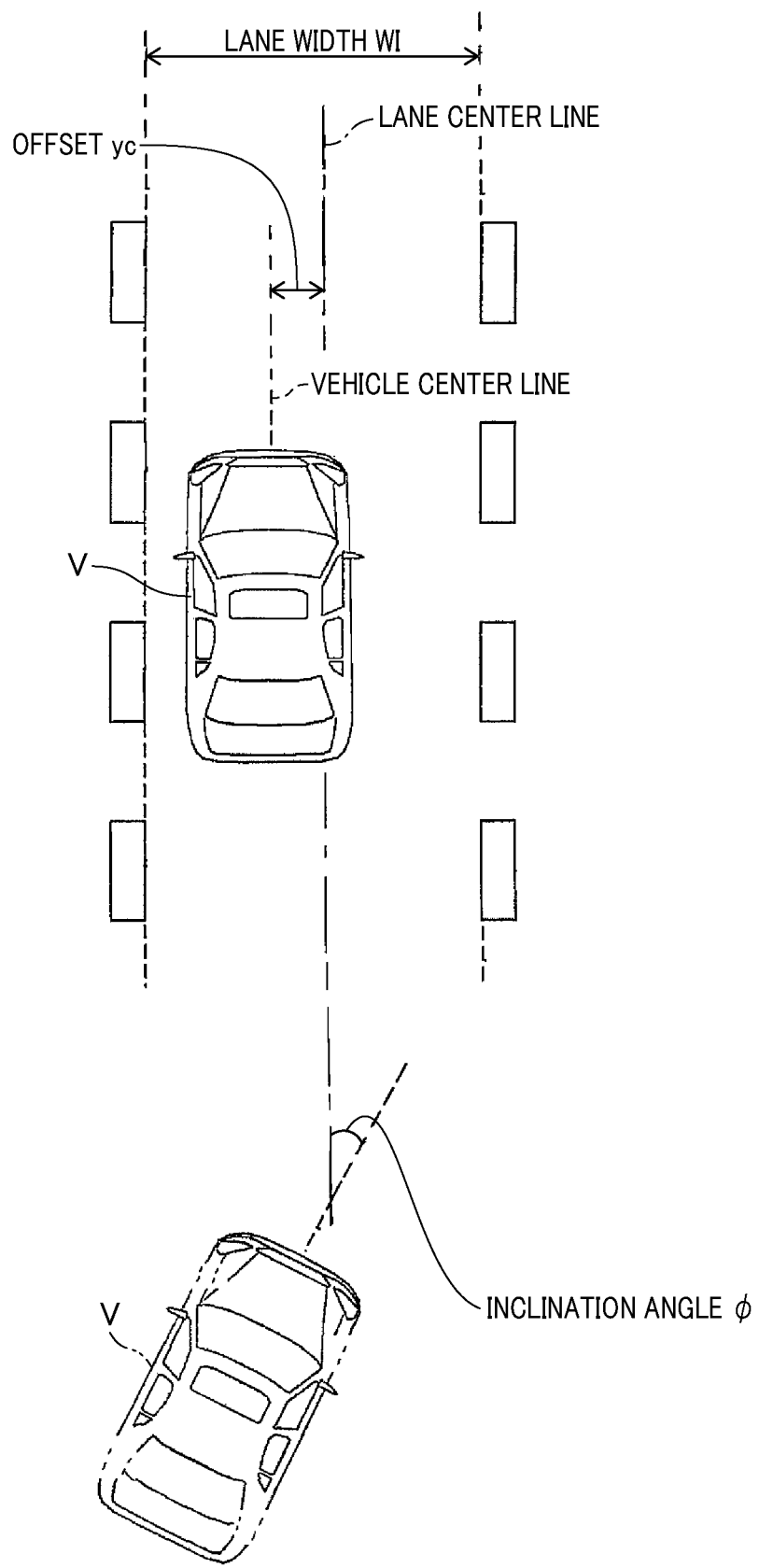
FIG. 4A is a view schematically illustrating some of road parameters according to the exemplary embodiment.

Note that the road parameters include, as parameters representing the conditions of the travelling road relative to the own vehicle V, an offset yc, a lane inclination φ, and a pitching quantity β. In addition, the road parameters also include, as parameters representing the shape of the travelling road, a curvature ρ and a lane width WI (see FIG. 4A).

The offset yc represents the minimum distance between

1. A line, which is referred to as a vehicle center line, extending from the image capturing unit 2 in the travelling direction of the own vehicle V while centering around the image capturing unit 2

2. A center line, which is referred to as a lane center line, of the travelling lane centered in the width direction of the travelling lane. Note that the minimum distance between the vehicle center line and the lane center line are measured when the vehicle center line and the lane center line have a predetermined identical height.

That is, the offset yc represents a value of displacement of the own vehicle V in the width direction of the own vehicle V; the width direction of the own vehicle V will be referred to as a vehicle width direction.

For example, if the own vehicle V is travelling while the vehicle center line is aligned with the lane center line, the offset yc becomes zero.

The lane inclination φ represents an inclined angle of a median line relative to the travelling direction of the own vehicle V; the median line is defined as a phantom line passing through an intermediate line between the right and left boundary lines, i.e. the median line is matched with the lane center line. In other words, the lane inclination φ represents a yaw angle of the own vehicle V.

The pitching quantity β represents a pitching angle of the own vehicle V relative to the travelling road.

The curvature ρ represents a curvature of the median line.

The lane width WI represents an interval between the right and left boundary lines in the direction, i.e. vehicle width direction, perpendicular to the vehicle center line of the own vehicle V.

Note that how the course estimating apparatus 4 estimates values of the road parameters set forth above is disclosed in, for example, Japanese Patent Application Publication No. 2015-199423. The disclosure of Japanese Patent Application Publication No. 2015-199423 is incorporated entirely herein by reference.

The information extractor 46 is configured to generate various types of information indicative of features of a marking line identified from each of the line candidates extracted by the candidate extractor 45. For example, the information extractor 46 includes a line type identifier 461, a feature generator 462, a variation generator 463, and a deviation generator 464, and a reliability calculator 465.

The line type identifier 461 is configured to identify the type of a marking line indicated by each of the line candidates in accordance with the edge points included in the corresponding one of the line candidates. For example, the line type identifier 461 is configured to identify the type of a marking line indicated by each of the line candidates in accordance with the distribution of the edge points included in the corresponding one of the line candidates. For example, the type identifier 461 identifies whether the marking line shown by each of the line candidates is a solid line or a dashed line, and/or whether the marking line shown by each of the line candidates is a single line or a part of multiple lines.

The feature generator 462 is configured to generate feature information indicative of features of the marking line specified by each of the line candidates. For example, the feature information for each of the marking lines specified by the respective line candidates include, as feature information items, a segment length L, a segment width W, an entire line length AL, a road-surface luminance contrast, and a black boundary luminance contrast.

Figure 4B:
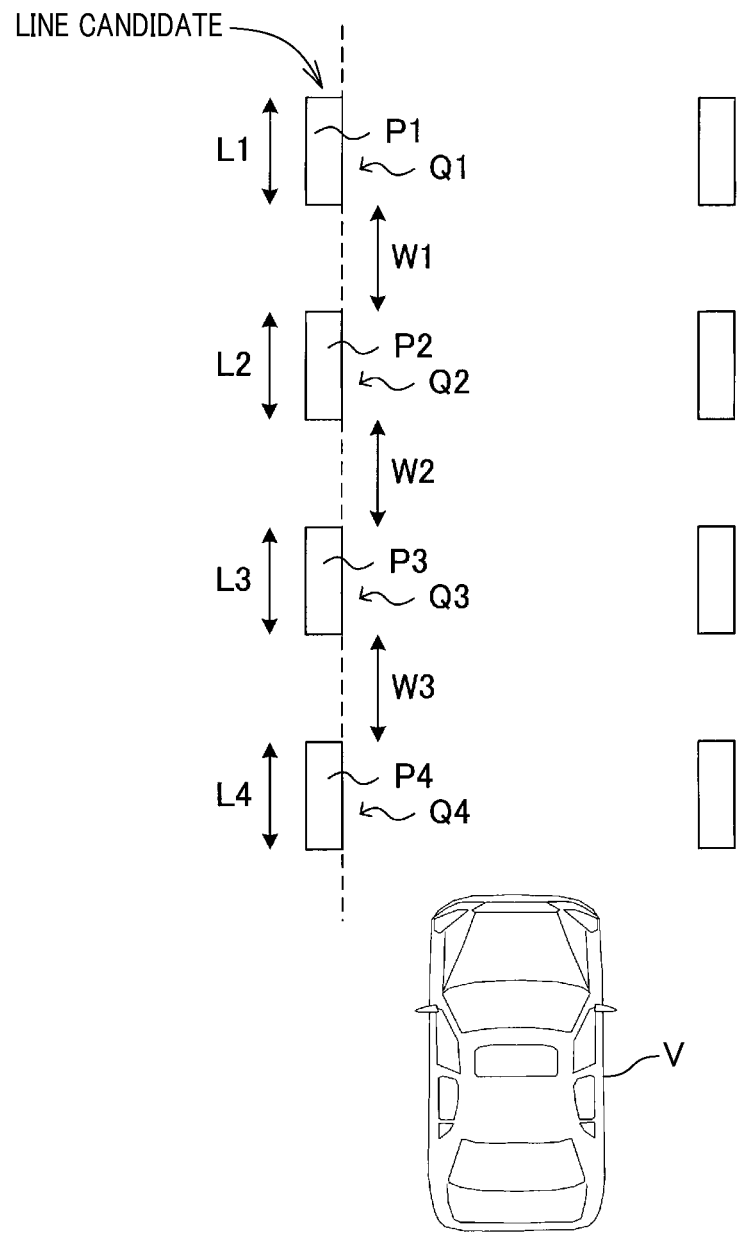
FIG. 4B is a view schematically illustrating some of feature information items generated by a feature information generator illustrated in FIG. 3.

Referring to FIG. 4, let us assume that the marking line specified by a selected one line candidate from the extracted line candidates is a dashed line comprised of m line segments, i.e. m line blocks, $B_1, B_2, \ldots, B_m$, which are aligned with intervals therebetween along the travelling road, where m is an integer equal to or more than 1. FIG. 4 illustrates four line segments, $B_1, B_2, B_3$, and $B_4$ as an example of the marking line.

The segment length L includes longitudinal lengths $L_1$ to $L_m$ of the respective line segments $B_1$ to $B_m$. If the marking line specified by the selected lane candidate is a solid line, i.e. is comprised of a single segment, upon m being 1, the segment length L is equal to the entire line length AL described later.

The segment interval W includes the lengths of intervals between the respective adjacent line segments $B_1$ to $B_m$. That is, the segment interval W includes the length of the interval $W_1$ between the adjacent line segments $B_1$ and $B_2$, the length of the interval $W_2$ between the adjacent line segments $B_2$ and $B_3$, ..., and the length of the interval $W_{m-1}$ between the adjacent line segments $B_{m-1}$ and $B_m$. If the marking line specified by the selected lane candidate is a solid line, i.e. is comprised of a single segment, upon m being 1, the segment interval W is not generated.

The entire line length AL includes the length between the closest edge point and the farthest edge point in the edge points contained in the selected boundary line candidate; the closest edge point is the closest to the own vehicle V, and the farthest edge point is the farthest to the own vehicle V. If the marking line specified by the selected lane candidate is a solid line, i.e. is comprised of a single segment, upon m being 1, the entire line length AL is substantially set to the longitudinal length of the single segment.

Each of values $P_1$ to $P_m$ of the road-surface luminance contrast of the respective line segments $B_1$ to $B_m$ represents a contrast ratio of the luminance level or color of the corresponding line segment to a predetermined reference luminance level or color. Note that each of the values $P_1$ to $P_m$ of the road-surface luminance contrast of the respective line segments $B_1$ to $B_m$ is normalized to be within the range from 0 to 1 inclusive. That is, the higher the luminance level of a line segment $B_i$ is, the closer the value $P_i$ of the road-surface luminance contrast is to 1 where reference character i represents any one of the line segments $B_1$ to $B_m$. In other words, the higher the contrast ratio of the luminance level of the line segment $B_i$ to the reference luminance level is, the closer the value $P_i$ of the road-surface luminance contrast is to 1.

Note that the reference luminance level is, for example, an average luminance level of the luminance levels of pixels of the road surface extracted from the captured image, and the reference luminance color is, for example, an average color of the colors of the road surface extracted from the captured image.

Each of values $Q_1$ to $Q_m$ of the black boundary luminance contrast of the respective line segments $B_1$ to $B_m$ represents a contrast ratio of the luminance level or color of the road surface located at the boundary of the corresponding line segment to the predetermined reference luminance level or color. Note that each of the values $Q_1$ to $Q_m$ of the black boundary luminance contrast of the respective line segments $B_1$ to $B_m$ is normalized to be within the range from 0 to 1 inclusive. That is, the higher the luminance level of the road surface located at the boundary of a line segment $B_i$ is, the closer the value $Q_i$ of the black boundary luminance contrast is to 1. In other words, the lower the contrast ratio of the luminance level of the road surface located at the boundary of the line segment $B_i$ to the reference luminance level is, the closer the value $Q_i$ of the black boundary luminance contrast is to 1.

The variation generator 463 is configured to generate variation information indicative of the variations of values of at least one of the feature information items generated by the feature generator 462 in the current processing cycle. For example, the variance generator 463 is configured to generate, as variation information items, the average PL and variance VL of the segment lengths $L_1$ to $L_m$, and generate the average PW and variance VW of the segment intervals $W_1$ to $WL_m$. Note that the variation generator 463 is configured to generate the variation information only if the marking line specified by a selected boundary line candidate includes line segments set forth above.

The deviation generator 464 is configured to generate

1. The deviation of the value(s) of at least one of the feature information items generated by the feature generator 462 in the current processing cycle from the value(s) of the corresponding at least one of the feature information items generated by the feature generator 462 in the last previous processing cycle 2. The deviation of the values of at least one of the variation information items generated by the variation generator 463 in the current processing cycle from the values of the corresponding at least one of the variation information items generated by the variation generator 463 in the last previous processing cycle For example, the deviation generator 464 is configured to 1. Generate an absolute value of the deviation $\Delta AL$, which will be referred to as a deviation $\Delta AL$, of the entire length AL generated by the feature generator 462 in the current processing cycle from the entire length AL generated by the feature generator 462 in the last previous processing cycle 2. Generate an absolute value of the deviation $\Delta PL$, which will be referred to as a deviation $\Delta PL$, of the average PL generated by the variation generator 463 in the current processing cycle from the average PL generated by the variation generator 463 in the last previous processing cycle 3. Generate an absolute value of the deviation $\Delta PW$, which will be referred to as a deviation $\Delta PW$, of the average PW generated by the variation generator 463 in the current processing cycle from the average PW generated by the variation generator 463 in the last previous processing cycle In addition, the deviation generator 464 is configured to set a line type identification flag to 1 if the type of the marking line indicated by at least one boundary line candidate in the last previous processing cycle has been changed to another type in the current processing cycle.

The reliability calculator 465 is configured to generate a first reliability DR and a second reliability DB for each of the line segments $B_i$. Each of the first and second reliabilities DR and DB takes a value being higher as the corresponding line segment $B_i$ is more similar to a white line.

For example, the reliability calculator 465 calculates the first reliability DR for each of the line segments $B_i$ as a function of the segment length $L_i$ and the value $P_i$ of the road-surface luminance contrast in accordance with the following equation (2):

$$DR = \frac{\sum_i (P_i \times L_i)}{\sum_i L_i} \quad (2)$$

Note that, if the marking line specified by a boundary line candidate is comprised of a single segment $B_1$, the value $P_1$ of the road-surface luminance contrast of the line segment $B_1$ is calculated as the first reliability DR of the marking line (line segment $B_1$).

In addition, the reliability calculator 465 for example calculates the second reliability DB for each of the line segments $B_i$ as a function of the segment length $L_i$ and the value $Q_i$ of the black boundary luminance contrast in accordance with the following equation (3):

$$DB = \frac{\sum_i (Q_i \times L_i)}{\sum_i L_i} \quad (3)$$

Note that, if the marking line specified by a boundary line candidate is comprised of a single segment $B_1$, the value $Q_1$ of the black boundary luminance contrast of the line segment $B_1$ is calculated as the second reliability DB of the marking line (line segment $B_1$).

The response level determiner 47 is configured to perform a response adjustment routine that adjusts the response level of the Kalman filter KF in accordance with the various types of information related to the marking line specified from each of the boundary line candidates, which are extracted by the information extractor 46.

The Kalman filter KF, which is expressed by the equation (1), has the Kalman gain K, and the response level of the Kalman filter KF is determined based on the Kalman gain K. The Kalman gain K represents a factor representing which of the actual observations $z_k$ in the current processing cycle and the predicted observations $H\bar{x}_k$ based on the priori estimate $\bar{x}_k$ is more reliable than the other thereof.

That is, adjustment of the Kalman gain K to reduce the contribution of the observation $z_k$ in the equation (1) enables the stability of the Kalman filter KF to be improved while the response level of the Kalman filter KF is reduced. In contrast, adjustment of the Kalman gain K to reduce the contribution of the priori estimate $\bar{x}_k$ in the equation (1) enables the response level of the Kalman filter KF to be improved while the stability of the Kalman filter KF is reduced.

For example, the response level determiner 47 is configured to adjust the Kalman gain K, i.e. the response level of the Kalman filter KF, by adjusting a measurement error covariance calculated based on the equation (1).

Figure 5:
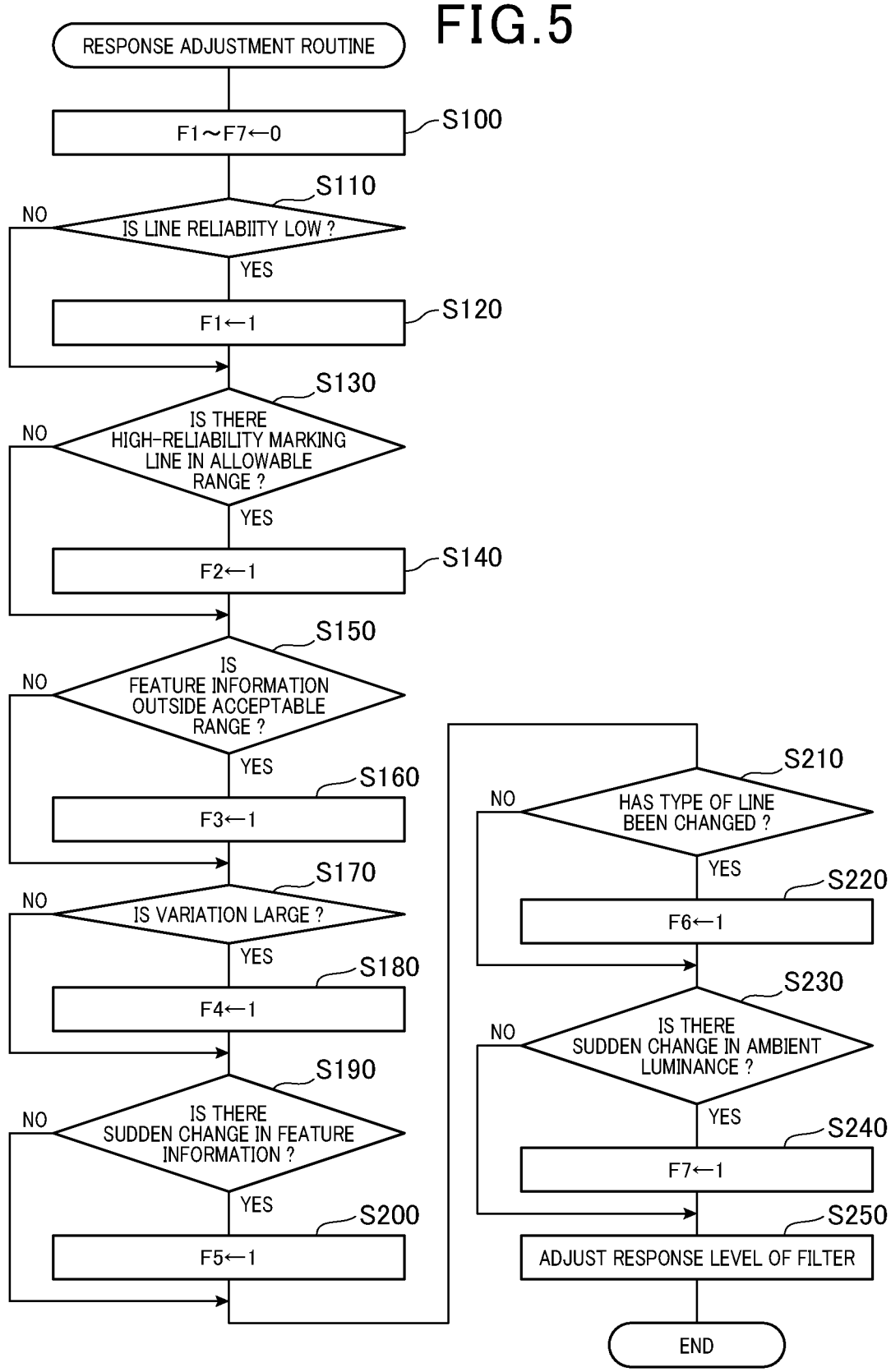
FIG. 5 is a flowchart schematically illustrating a response adjustment routine carried out by a response level determiner of the road estimating apparatus illustrated in FIG. 3.

Next, the following describes the response adjustment routine repeatedly carried out by the response level determiner 47, i.e. the CPU 4a, every processing cycle using FIG. 5. In particular, the response level determiner 47 executes the response adjustment routine for each of the selected boundary line candidates selected by the selector 48. In the following descriptions, the selected boundary line candidate will therefore represent any one of the selected boundary line candidates.

In step S100, the response level determiner 47 resets each of previously prepared determination flags F1 to F7 to zero.

In step S110, the response level determiner 47 determines whether at least one of the first reliability DR and the second reliability DB of the selected boundary line candidate calculated by the information extractor 46 is less than a predetermined reliability threshold. Upon determination that at least one of the first reliability DR and the second reliability DB is less than the predetermined reliability threshold (YES in step S110), the response level determiner 47 determines that there is an unstable situation in which the reliability, i.e. the line reliability, of the selected boundary line candidate being a white line is low. This results in the response adjustment routine proceeding to step S120.

Otherwise, neither the first reliability DR nor the second reliability DB are less than the predetermined reliability threshold (NO in step S110), the response level determiner 47 determines that the reliability of the selected boundary line candidate being a white line is high. This results in the response adjustment routine proceeding to step S130.

In step S120, the response level determiner 47 sets the determination flag F1 to 1, resulting in the response adjustment routine proceeding to step S130.

Figure 6A:
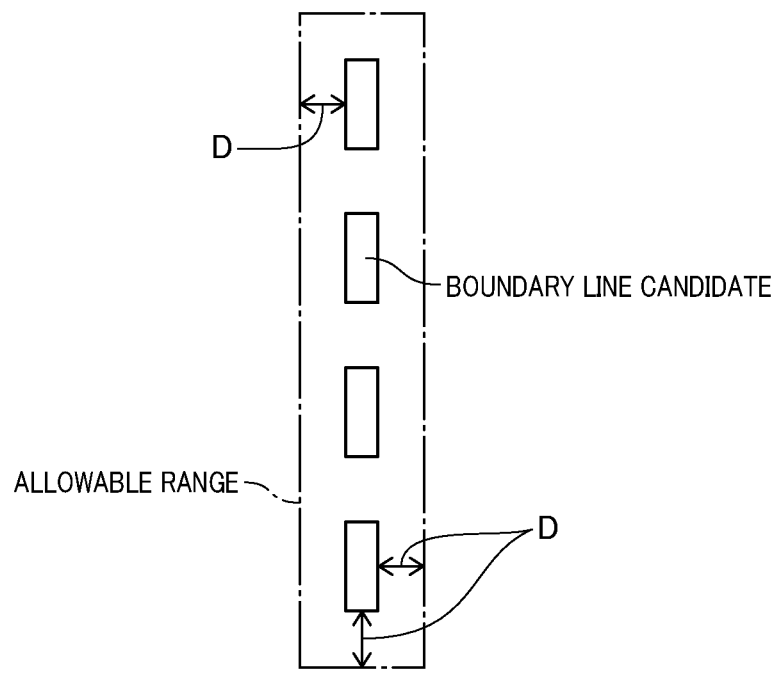
FIG. 6A is a view schematically illustrating an example of an allowable range established around the outline of a selected boundary line candidate.

In step S130, the response level determiner 47 determines whether there is at least one high-reliability marking line in an allowable range previously determined for the selected boundary line candidate. The high-reliability marking line represents a boundary line candidate whose first and second reliabilities DR and DB are each equal to or more than the corresponding one of the reliability thresholds. In addition, the allowable range for the selected boundary line candidate is defined as a predetermined shaped margin, such as a rectangular shaped margin, around the outline of the selected boundary line candidate with a common distance D relative to the outline of the selected boundary line candidate (see FIG. 6A). The rectangular shaped margin with the common maximum distance D is defined such that edge points located within the area surrounded by the rectangular shaped margin are regarded to constitute the selected boundary line candidate.

Upon determination that there is at least one high-reliability marking line in the allowable range previously determined for the selected boundary line candidate (YES in step S130), the response level determiner 47 determines that there is an unstable situation in which the selected boundary line candidate and the at least one high-reliability marking line may be confused with each other. This results in the response adjustment routine proceeding to step S140.

Otherwise, upon determination that there are no high-reliability marking lines in the allowable range previously determined for the selected boundary line candidate (NO in step S130), the response adjustment routine proceeds to step S150.

In step S140, the response level determiner 47 sets the determination flag F2 to 1, resulting in the response adjustment routine proceeding to step S150.

In step S150, the response level determiner 47 determines whether the value of at least one of the feature information items generated by the information extractor 46 is outside a predetermined acceptable range for the corresponding at least one of the feature information items. For example, the response level determiner 47 determines whether the average PL of the segment lengths $L_1$ to $L_m$ is outside a threshold length predetermined under laws and regulations, or the average PW of the segment intervals $W_1$ to $WL_m$ is outside a threshold interval predetermined under laws and regulations. Each of the threshold length and interval serves as an example of the acceptable range.

Upon determination that the value of at least one of the feature information items generated by the information extractor 46 is outside the predetermined acceptable range for the corresponding at least one of the feature information items (YES in step S150), the response level determiner 47 determines that there is an unstable situation in which the reliability of the selected boundary line candidate is low. This results in the response adjustment routine proceeding to step S160.

Otherwise, upon determination that the value of each of the feature information items generated by the information extractor 46 is not outside the predetermined acceptable range for the corresponding one of the feature information items (NO in step S150), the response adjustment routine proceeds to step S170.

In step S160, the response level determiner 47 sets the determination flag F3 to 1, resulting in the response adjustment routine proceeding to step S170.

In step S170, the response level determiner 47 determines whether at least one of the variance VL of the segment lengths $L_1$ to $L_m$ and the variance VW of the segment intervals $W_1$ to $WL_m$ is equal to or more than a predetermined variation threshold. Upon determination that at least one of the variance VL of the segment lengths $L_1$ to $L_m$ and the variance VW of the segment intervals $W_1$ to $WL_m$ is equal to or more than the predetermined variation threshold (YES in step S170), the response level determiner 47 determines that the segments included in the selected boundary line candidate are nonuniformly distributed, and therefore determines that there is an unstable situation in which the reliability of the selected boundary line candidate being a marking line is low. This results in the response adjustment routine proceeding to step S180.

Otherwise, upon determination that neither the variance VL of the segment lengths $L_1$ to $L_m$ nor the variance VW of the segment intervals $W_1$ to $WL_m$ is equal to or more than the predetermined variation threshold (NO in step S170), the response adjustment routine proceeds to step S190.

In step S180, the response level determiner 47 sets the determination flag F4 to 1, resulting in the response adjustment routine proceeding to step S190.

In step S190, the response level determiner 47 determines whether at least one of the deviation $\Delta PL$ of the average PL of the segment lengths $L_1$ to $L_m$ and the deviation $\Delta PW$ of the average PW of the segment intervals $W_1$ to $W_m$ between the current processing cycle and the last previous processing cycle is equal to or more than a predetermined sudden change threshold. Upon determination that at least one of the deviation ΔPL of the average PL of the segment lengths $L_1$ to $L_m$ and the deviation ΔPW of the average PW of the segment intervals $W_1$ to $W_m$ between the current processing cycle and the last previous processing cycle is equal to or more than the predetermined sudden change threshold (YES in step S190), the response level determiner 47 determines that there is an unstable situation in which the value of at least one of the deviation ΔPL and the deviation ΔPW as one of the feature information items has been suddenly changed due to any disturbance. This results in the response adjustment routine proceeding to step S200.

Otherwise, upon determination that neither the deviation ΔPL of the average PL of the segment lengths $L_1$ to $L_m$ nor the deviation ΔPW of the average PW of the segment intervals $W_1$ to $W_m$ between the current processing cycle and the last previous processing cycle is equal to or more than the predetermined sudden change threshold (NO in step S190), the response level determiner 47 determines that the selected boundary line candidate is unlikely to have influenced on any disturbance. This results in the response adjustment routine proceeding to step S210.

In step S200, the response level determiner 47 sets the determination flag F5 to 1, resulting in the response adjustment routine proceeding to step S210.

In step S210, the response level determiner 47 determines whether the type of the selected boundary line candidate identified from the information extractor 46 in the last previous processing cycle has been changed to another type in the current processing cycle. In other words, in step S210, the response level determiner 47 determines whether the line type identification flag has been set to 1. Upon determination that the line type identification flag has been set to 1 (YES in step S210), the response level determiner 47 determines that there is an unstable situation in which the identified result of the type of the selected line boundary candidate by the information extractor 46 is varied due to any disturbance. This results in the response adjustment routine proceeding to step S220.

Otherwise, upon determination that the line type identification flag has been maintained at 0 (NO in step S210), the response adjustment routine proceeds to step S230.

In step S220, the response level determiner 47 sets the determination flag F6 to 1, resulting in the response adjustment routine proceeding to step S230.

In step S230, the response level determiner 47 determines whether the luminance deviation ΔC of the luminance level obtained by the current processing cycle from the luminance level obtained by the last previous processing cycle, which is generated by the ambient information obtaining unit 43, is equal to or more than a predetermined luminance threshold. The luminance threshold can be set to a level that enables change between the average luminance level of all the pixels in one image and the average luminance level of all the pixels in the next image generated while the own vehicle V is passing through a shade region, such as the region under an elevated structure, to be detected.

Upon determination that the luminance deviation ΔC of the luminance level obtained by the current processing cycle from the luminance level obtained by the last previous processing cycle is equal to or more than the predetermined luminance threshold (YES in step S230), the response level determiner 47 determines that there is an unstable situation in which the marking-line recognition environment has been suddenly changed due to, for example, entrance of the own vehicle V into tunnel or a region under an elevated structure. This results in the response adjustment routine proceeding to step S240.

Otherwise, upon determination that the luminance deviation ΔC of the luminance level obtained by the current processing cycle from the luminance level obtained by the last previous processing cycle is less than the predetermined luminance threshold (NO in step S230), the response level determination routine proceeds to step S250.

In step S240, the response level determiner 47 sets the determination flag F7 to 1, resulting in the response adjustment routine proceeding to step S250.

In step S250, the response level determiner 47 determines the response level of the Kalman filter KF as a function of at least one of the values of the flags F1 to F7, the speed of the own vehicle V, and the yaw rate of the own vehicle V. Thereafter, the response level determiner 47 terminates the response adjustment routine.

For example, the response level determiner 47 determines, in step S250, the response level of the Kalman filter KF to thereby reduce the response level of the Kalman filter KF stored in the memory 4b if at least one of the values of the flags F1 to F7 is set to 1. In other words, the response level determiner 47 maintains, in step S250, the response level of the Kalman filter KF to be high until at least one of the values of the flags F1 to F7 is changed from 0 to 1.

As another example, in step S250, the response level determiner 47 determines the response level of the Kalman filter KF to thereby reduce the response level of the Kalman filter KF with an increase of the number of the values of the flags F1 to F7 being set to 1 or with an increase of the speed of the own vehicle V or with a decrease of the yaw rate of the own vehicle V. In other words, the response level determiner 47 adjusts the response level of the Kalman filter KF such that, the larger the number of the values of the flags F1 to F7 being set to 1 is, or the faster the speed of the own vehicle V is, or the lower the yaw rate of the own vehicle V is, the lower the response level of the Kalman filter KF is.

As a further example, the response level determiner 47 weights the values of the flags F1 to F7, and calculates the sum of the weighted values of the flags F1 to F7. Then, the response level determiner 47 adjusts the response level of the Kalman filter KF such that, the larger the calculated sum of the weighted values of the flags F1 to F7 is, the lower the response level of the Kalman filter KF is.

In addition, the response level determiner 47 can change the response level of the Kalman filter KF as a function of (1) The first reliability DR of the selected boundary line candidate (2) The second reliability DB of the selected boundary line candidate (3) The values of the feature information items obtained by the information extractor 46

(4) The variations of the values of the feature information items obtained by the information extractor 46

(5) The degree of sudden change of at least one of the feature information items obtained by the information extractor 46

(6) The degree of sudden change of the luminance level around the own vehicle V obtained by the ambient information obtaining unit 43

(7) How close the selected line boundary candidate is to the at least one high-reliability marking line How Road Estimating Apparatus 4 Works Next, the following describes how the road estimating apparatus 4 works.

Figure 6B:
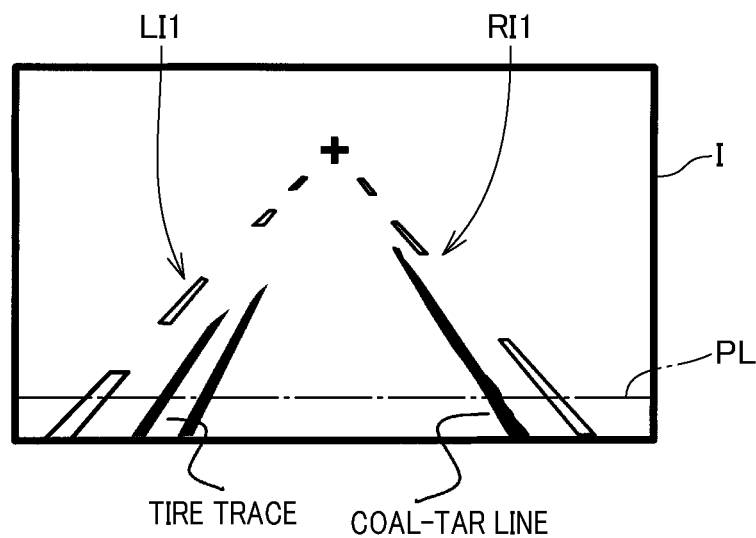
FIG. 6B is a view schematically illustrating a forward image captured by an image capturing unit.

Let us assume a travelling situation of the own vehicle V in which a forward scene is captured as a forward image I by the image capturing unit 2 as illustrated in FIG. 6B. As illustrated in FIG. 6B, there are tire traces extending along a left boundary line, i.e. left white dashed line, LI1 to be adjacent to the left boundary line LI1 on a road, and there is a coal-tar line extending along a right boundary line, i.e. a right dashed white line, RI1 to be adjacent to the right boundary line RI1 on the road. Let us also assume that there are no shade regions on the road in the forward scene.

In the above assumption, FIG. 7 illustrates a luminance level distribution of the image I on a horizontal pixel line PL. As illustrated in FIG. 7, the luminance levels of the respective tire traces and the coal-tar line are lower than the luminance level of the left boundary line LI1 and the luminance level of the right boundary line RI1 white dashed line. This enables the first reliability DR for each of the tire traces and the coal-tar line to be lower than the first reliability DR for each of the left and right boundary lines LI1 and RI1. Similarly, this enables the second reliability DB for each of the tire traces and the coal-tar line to be lower than the second reliability DR for each of the left and right boundary lines LI1 and RI1.

This enables the road estimating apparatus 4 to determine that there is an unstable situation in which the reliability of a selected boundary line candidate based on such a tire trace or a coal-tar line being a lane boundary line, i.e. a white line, is low (see step S120). This makes it possible to reduce the response level of the Kalman filter KF if there is an unstable situation in which the reliability of a selected boundary line candidate based on such a tire trace or a coal-tar line being a lane boundary line, i.e. a white line, is low.

Figure 8:
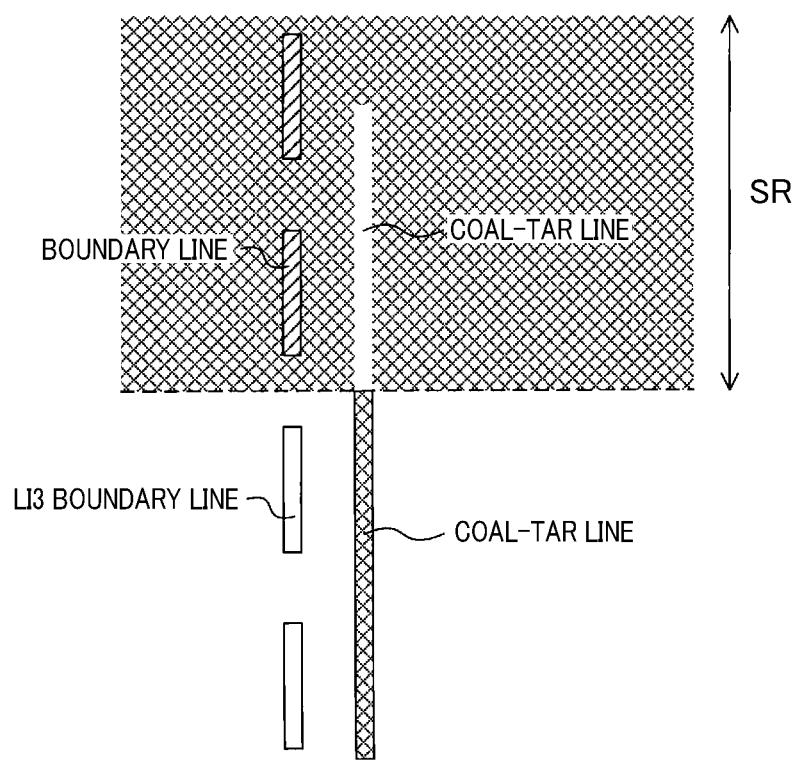
FIG. 8 is a view schematically illustrating a forward image captured by the image capturing unit if there is a travelling situation of an own vehicle passing through a shade region under an elevated structure.

If there is a travelling situation of the own vehicle V passing through a shade region SR under an elevated structure, a forward scene is captured as a forward image I1 by the image capturing unit 2 as illustrated in FIG. 8. As illustrated in FIG. 8, the captured image I1 becomes dark, because time lag of control of the exposure time of the image capturing unit 2. At that time, if light, which is entering into the shade region, is reflected by a coal-tar line located in the shade region SR, the luminance level of the coal-tar line becomes higher than the luminance level of a part of a boundary line LI3; the part of the boundary line LI3 is located to be adjacent to the cola-tar line within the shade region SR. If the coal-tar line is erroneously recognized as a boundary line, the selected boundary line candidate based on an actual lane boundary line, i.e. a dashed white line, may be switched to an erroneous selected boundary line candidate based on the coal-tar line.

If the selected boundary line candidate based on an actual lane boundary line is switched to an erroneous selected boundary line candidate based on the coal-tar line, the value of at least one of the feature information items, such as the type of the selected boundary line candidate or the entire length AL of the selected boundary candidate is suddenly changed to another value. Similarly, if the selected boundary line candidate based on an actual lane boundary line is switched to an erroneous selected boundary line candidate based on the coal-tar line, the value of the luminance level in front of the own vehicle V is suddenly changed to another value.

From this viewpoint, the road estimating apparatus 4 described above is configured to detect this sudden change of the value of the at least one of the feature information items (see YES in at least one of steps S190 and 210) or this sudden change of the value of the luminance level in front of the own vehicle V (see YES in step S230). This enables the road estimating apparatus 4 to determine that there is an unstable situation in which the marking-line recognition environment has been suddenly changed due to, for example, entrance of the own vehicle V into tunnel or a region under an elevated structure. This makes it possible to reduce the response level of the Kalman filter KF if there is an unstable situation in which the marking-line recognition environment has been suddenly changed due to, for example, entrance of the own vehicle V into tunnel or a region under an elevated structure.

Figure 9A:
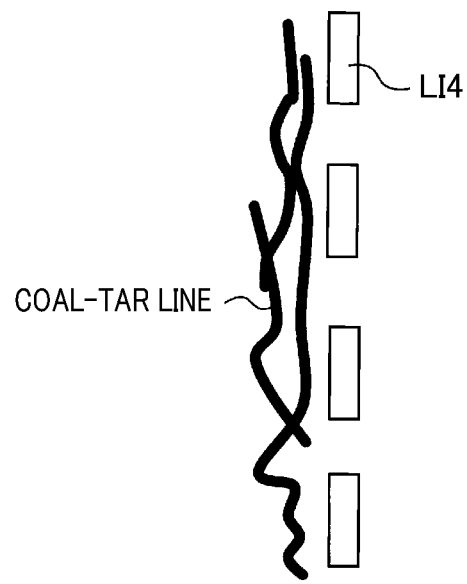
FIG. 9A is a view schematically illustrating a group of coal-tar lines extending along a lane boundary line to be adjacent to the lane boundary line.
Figure 9B:
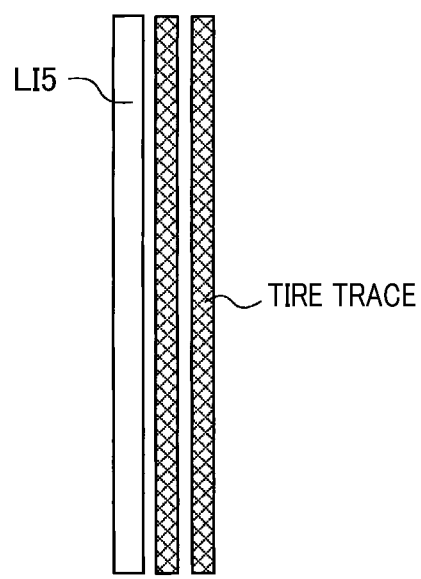
FIG. 9B is a view schematically illustrating a group of tire traces extending along a lane boundary line to be adjacent to the lane boundary line.

As illustrated in FIG. 9A, there is a group of coal-tar lines extending along a lane boundary line LI4 to be adjacent to the lane boundary line LI4 on the road in front of the own vehicle V. In addition, as illustrated in FIG. 9B, there is a group of tire traces extending along a lane boundary line LI5 to be adjacent to the lane boundary line LI5 on the road in front of the own vehicle V.

As illustrated in FIG. 7, the luminance levels of the respective group of coal-tar lines and the group of tire traces are lower the luminance level of the road surface. This may result in such a low luminance level portion (the group of coal-tar lines or the group of tire traces) being erroneously recognized as the road surface, and the actual road surface being erroneously recognized as a lane boundary line.

However, because the luminance levels of the line segments of the road surface, which are erroneously recognized as a lane boundary line, are similar to the reference luminance level, the first reliability DR of the line segments becomes lower. In addition, because the luminance levels of the line segments of the low luminance level portion, such as the group of coal-tar lines or the group of tire traces, which is erroneously recognized as the road surface, are lower than the reference luminance level, the second reliability DB of the low luminance level portion becomes lower.

That is, the road estimating apparatus 4 makes it harder for the selector 48 to select such a low luminance level portion, such as the group of coal-tar lines or the group of tire traces, as a lane boundary candidate.

Additionally, if such a low luminance level portion, such as the group of coal-tar lines or the group of tire traces, as a lane boundary candidate, is selected as a lane boundary candidate, it is possible to determine that there is an unstable situation in which the reliability of a selected boundary line candidate based on the low luminance level portion being a lane boundary line, i.e. a white line, is low (see step S120). This makes it possible to reduce the response level of the Kalman filter KF if there is an unstable situation in which the reliability of a selected boundary line candidate based on such a tire trace or a coal-tar line being a lane boundary line, i.e. a white line, is low. This results in reduction of adverse effects of disturbance due to coal-tar lines and/or tire traces on the accuracy of the road estimation routine, i.e. accuracy of the estimated travelling road of the own vehicle V.

Advantageous Effect

As described in detail above, the exemplary embodiment obtains the following advantageous effects.

The road estimating apparatus 4 is configured to maintain the response level of the Kalman filter KF to be high until it is determined that there is an unstable situation that causes the accuracy of extracting the edges to be reduced. This configuration ensures the high response level of the Kalman filter KF independently of whether the own vehicle V is travelling toward a straight section of a road or a curved section in the road. For example, the road estimating apparatus 4 maintains the high response level of the Kalman filter KF before measurement of the yaw rate of the own vehicle V upon the own vehicle V being entering a curve in the road.

The road estimating apparatus 4 is configured to reduce the response level of the Kalman filter KF when it is determined that there is an unstable situation that causes the accuracy of extracting the edges to be reduced, i.e. the accuracy of recognizing lane marking lines to be reduced. This enables the stability of estimating the state values of the travelling road of the own vehicle V to be improved, making it possible to inhibit the lane keeping assist control based on the estimated state values of the travelling road to be more stable.

Figure 10:
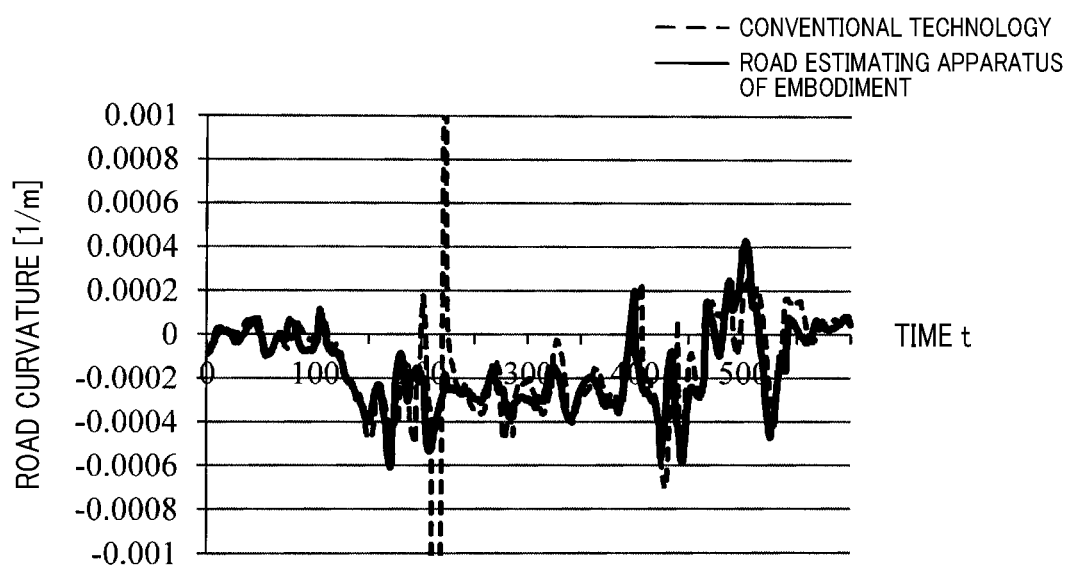
FIG. 10 is a graph schematically illustrating a first result of a curvature of a straight road including cracks thereon estimated by a conventional technology disclosed in the published patent document using a dashed line, and a second result of the curvature of the same road estimated by the road estimating apparatus while the own vehicle is travelling on the same road using a solid line.

FIG. 10 illustrates (1) The first result of the curvature of a straight road including cracks on road estimated by the conventional technology disclosed in the published patent document, in which the response level of a Kalman filter is kept unchanged while a corresponding vehicle is travelling on the straight road, using a dashed line (2) The second result of the curvature of the same road estimated by the road estimating apparatus 4 while the own vehicle V is travelling on the same road using a solid line The first result estimated by the conventional technology shows that, upon the corresponding vehicle travelling on a road with cracks, the cracks may be erroneously recognized as lane boundary lines, resulting in the estimated result of the curvature of the road becoming unstable.

In contrast, the second result estimated by the road estimating apparatus 4 shows that, even if the own vehicle 4 is travelling on the same road with the cracks, the road estimating apparatus 4 prevents the cracks from being erroneously recognized as lane boundary lines, resulting in unstable estimation of the curvature of the road without sudden change of the curvature of the road.

Modification

The exemplary embodiment of the present disclosure has been described above. The present disclosure is however not limited to the exemplary embodiment, and can be variably modified.

The response level determiner 47 determines that there is an unstable situation for recognizing the selected boundary line candidate as a lane boundary line upon determination that there is at least one high-reliability marking line, i.e. another boundary line candidate, in the allowable range previously determined for the selected boundary line candidate. The present disclosure is however not limited to the configuration.

Figure 11:
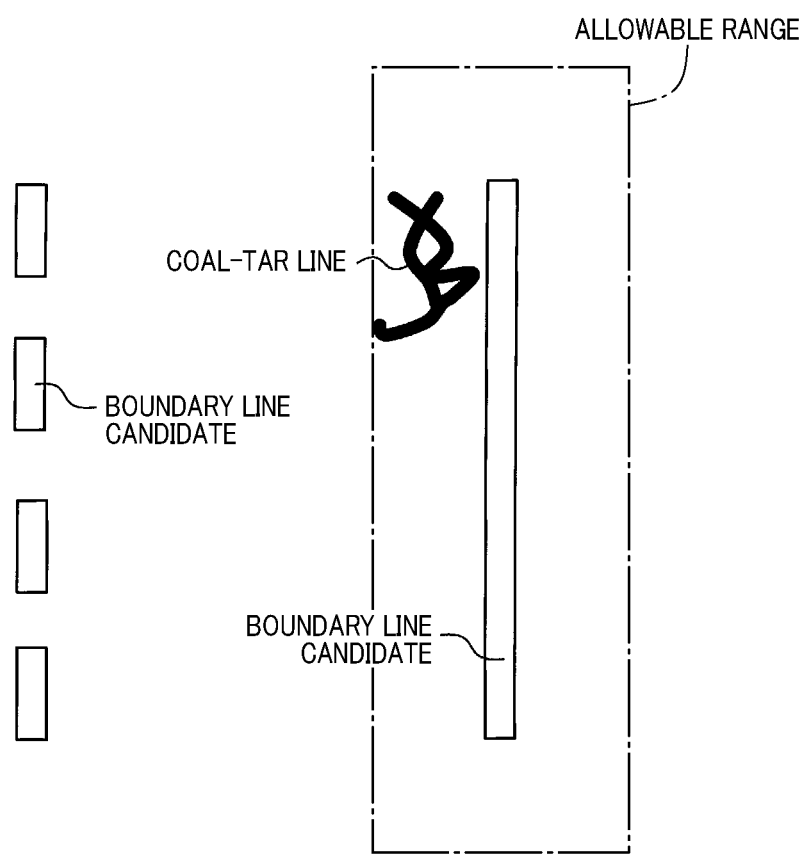
FIG. 11 is a view schematically illustrating a situation where there are many edge points, such as coal-tar lines, in the allowable range previously determined for a selected boundary line candidate.

Specifically, the response level determiner 47 can be configured to determine that there is an unstable situation for recognizing the selected boundary line candidate as a lane boundary line upon determination that there are many edge points due to any disturbance, such as coal-tar lines, in the allowable range previously determined for the selected boundary line candidate; these edge points are not extracted as a boundary line candidate (see FIG. 11).

The estimator 49 estimates the road parameters using the Kalman filter KF, but the present disclosure is not limited to the configuration. Specifically, the estimator 49 can include another filter, such as an $H_\infty$ filter, i.e. an H-infinity filter, used to estimate the variables of a state estimation model. The response level determiner 47 can be configured to adjust a response level of another filter in the same manner as adjusting the response level of the Kalman filter KF.

The functions of one element in the above embodiment can be distributed as plural elements, and the functions that plural elements have can be combined into one element. At least part of the structure of the above embodiment can be replaced with a known structure having the same function as the at least part of the structure of the embodiment. A part of the structure of the above embodiment can be eliminated. All aspects included in the technological ideas specified by the language employed by the claims constitute embodiments of the present disclosure.

The present disclosure can be implemented by various embodiments in addition to the road estimating apparatus; the various embodiments include systems each including the road estimating apparatus, programs for serving a computer as the road estimating apparatus, non-transitory storage media storing the programs, and road estimating methods.

While the illustrative embodiment and its modifications of the present disclosure have been described herein, the present disclosure is not limited to the embodiments and their modifications described herein. Specifically, the present disclosure includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. A travelling road estimating apparatus comprising:
an edge extractor configured to:
extract edge points from an image of a travelling road ahead of a vehicle captured by an image capturing unit of the vehicle; and
calculate coordinates of each of the edge points, each of the edge points representing an extracted pixel of the image, the extracted pixel having a luminance level higher by at least a predetermined threshold level than a luminance level of at least one of pixels of the image adjacent to the extracted pixel;
a candidate extractor configured to extract, based on the coordinates of each of the edge points, at least one line candidate that is a candidate of a lane marking line of the travelling road;
a selector configured to select the at least one line candidate as a selected candidate;
an estimator configured to estimate, based on the coordinates of at least one of the edge points included in the selected candidate, a road parameter using a previously prepared filter having an adjustable response level, the road parameter being associated with a condition of the travelling road relative to the vehicle and a shape of the travelling road;
a determiner configured to determine whether there is an unstable situation that causes an accuracy of estimating the edge points by the edge extractor to be reduced;
a response level adjuster configured to adjust the response level of the filter in accordance with determination of whether there is an unstable situation that causes an accuracy of estimating the edge points by the edge extractor to be reduced; and
a reliability calculator configured to calculate a reliability of the at least one line candidate selected as the selected candidate, the reliability of the selected candidate taking a value being higher as the selected candidate is more similar to the lane marking line, wherein the determiner is configured to:
determine whether the calculated reliability is lower than a predetermined reliability threshold; and
determine that there is the unstable situation upon determination that the calculated reliability is lower than the predetermined reliability threshold.

2. The travelling road estimating apparatus according to claim 1, wherein:
the reliability calculator is configured to:
set the reliability of the selected candidate to be higher with an increase of at least one of a first contrast and a second contrast,
the first contrast being a contrast ratio of a luminance level of a line identified from the selected candidate to an averaged luminance level of a road-surface portion of the image,
the second contrast being a contrast ratio of a color of the line identified from the selected candidate to an averaged color of the road-surface portion of the image.

3. The travelling road estimating apparatus according to claim 1, wherein:
the reliability calculator is configured to:
set the reliability of the selected candidate to be higher with a decrease of at least one of a first contrast and a second contrast,
the first contrast being a contrast ratio of a luminance level of a road-surface portion of the image at a boundary of a line identified from the selected candidate to an averaged luminance level of the road-surface portion of the image,
the second contrast being a contrast ratio of a color of the road-surface portion of the image at the boundary of the line identified from the selected candidate to an averaged color of the road-surface portion of the image.

4. The travelling road estimating apparatus according to claim 1, wherein:
the at least one line candidate extracted by the candidate extractor comprises a plurality of line candidates;
the reliability calculator is configured to calculate the reliability of each of the line candidates, at least one of the line candidates being selected as the selected candidate; and
the determiner is configured to:
determine whether there is at least one low-reliability line candidate in the line candidates within an allowable range defined around the selected candidate, the reliability of the at least one low-reliability line candidate being lower than a predetermined threshold; and
determine that there is the unstable situation upon determination that there is at least low-reliability candidate in the line candidates within the allowable range defined around the selected candidate.

5. The travelling road estimating apparatus according to claim 1, further comprising:
a feature generator configured to generate an item of feature information indicative of a feature of a line identified from the selected candidate,
wherein the determiner is configured to:
determine whether the generated item of the feature information is outside a predetermined acceptable range; and
determine that there is the unstable situation upon determination that the generated item of the feature information is outside a predetermined acceptable range.

6. The travelling road estimating apparatus according to claim 5, wherein:
the feature generator is configured to, if the line identified from the selected candidate is comprised of a plurality of line segments, generate, as the item of the feature information, an item of the feature information for each of the line segments, the feature generator being configured to calculate an average and a variation of the generated line segments; and
the determiner is configured to:
determine whether at least one of the calculated average and the variation is equal to or more than a corresponding at least one feature threshold; and
determine that there is the unstable situation upon determination that the at least one of the calculated average and the variation is equal to or more than the corresponding at least one feature threshold.

7. The travelling road estimating apparatus according to claim 6, wherein:
the line identified from the selected candidate is a dashed line comprised of the plurality of line segments; and
the feature generator is configured to generate, as the item of the feature information for each of the line segments, at least one of:
a longitudinal length of the corresponding one of the line segments; and
a length of each of intervals between the respective plurality of line segments.

8. The travelling road estimating apparatus according to claim 5, wherein:
the image is captured by the camera every predetermined processing cycle;
the feature generator is configured to:
generate the item of the feature information every predetermined processing cycle, the item of the feature information generated for a first processing cycle in the processing cycles being referred to as a first item, the item of the feature information generated for a second processing cycle in the processing cycles being referred to as a second item, the second processing cycle being next to the first processing cycle; and
calculate an absolute value of a deviation of the second item of the feature information from the first item of the feature information; and
the determiner is configured to:
determine whether the absolute value of the deviation of the second item of the feature information from the first item of the feature information is equal to or more than a predetermined sudden-change threshold; and
determine that there is the unstable situation upon determination that the absolute value of the deviation of the second item of the feature information from the first item of the feature information is equal to or more than the predetermined sudden-change threshold.

9. The travelling road estimating apparatus according to claim 8, wherein:
the feature generator is configured to generate, as the item of the feature information every predetermined processing cycle, a type of the line identified from the selected candidate, the type of the line identified from the selected candidate for a first processing cycle in the processing cycles being referred to as a first line type, the type of the feature information generated for a second processing cycle in the processing cycles being referred to as a second line type, the second processing cycle being next to the first processing cycle; and
the determiner is configured to:
    determine whether the second line type has been changed from the first line type; and
    determine that there is the unstable situation upon determination that the second line type has been changed from the first line type.

10. The travelling road estimating apparatus according to claim 1, wherein:
    the image is captured by the camera every predetermined processing cycle,
    the travelling road estimating apparatus further comprising:
    an ambient information generator configured to:
        obtain a luminance level around the road ahead of the vehicle every predetermined processing cycle, the luminance level around the road ahead of the vehicle for a first processing cycle in the processing cycles being referred to as a first luminance level, the luminance level around the road ahead of the vehicle for a second processing cycle in the processing cycles being referred to as a second luminance level, the second processing cycle being next to the first processing cycle; and
        calculate an absolute value of a luminance deviation of the second luminance level from the first luminance level,
    wherein the determiner is configured to:
        determine whether the generated absolute value of the luminance deviation is equal to or more than a predetermined luminance threshold; and
        determine that there is the unstable situation upon determination that the absolute value of the luminance deviation is equal to or more than the predetermined luminance threshold.

11. The travelling road estimating apparatus according to claim 1, wherein:
    the response level adjuster is configured to change a degree of adjustment of the response level of the filter as a function of at least one of a speed of the vehicle and the reliability of the selected candidate.

12. The travelling road estimating apparatus according to claim 1, wherein the estimator is configured to estimate the road parameter using a Kalman filter as the previously prepared filter.

13. A travelling road estimating method comprising:
    extracting edge points from an image of a travelling road ahead of a vehicle captured by an image capturing unit of the vehicle;
    calculating coordinates of each of the edge points, each of the edge points representing an extracted pixel of the image, the extracted pixel having a luminance level higher by at least a predetermined threshold level than a luminance level of at least one of pixels of the image adjacent to the extracted pixel;
    extracting, based on the coordinates of each of the edge points, at least one line candidate that is a candidate of a lane marking line of the travelling road;
    selecting the at least one line candidate as a selected candidate;
    estimating, based on the coordinates of at least one of the edge points included in the selected candidate, a road parameter using a previously prepared filter having an adjustable response level, the road parameter being associated with a condition of the travelling road relative to the vehicle and a shape of the travelling road;
    determining whether there is an unstable situation that causes an accuracy of estimating the edge points by the extracting step to be reduced;
    adjusting the response level of the filter in accordance with determination of whether there is an unstable situation that causes an accuracy of estimating the edge points by the edge-point extracting step to be reduced; and
    calculating a reliability of the at least one line candidate selected as the selected candidate, the reliability of the selected candidate taking a value being higher as the selected candidate is more similar to the lane marking line,
    wherein the determining step comprises:
        determining whether the calculated reliability is lower than a predetermined reliability threshold; and
        determining that there is the unstable situation upon determination that the calculated reliability is lower than the predetermined reliability threshold.

14. The travelling road estimating method according to claim 13, wherein:
    the calculating step sets the reliability of the selected candidate to be higher with an increase of at least one of a first contrast and a second contrast,
    the first contrast being a contrast ratio of a luminance level of a line identified from the selected candidate to an averaged luminance level of a road-surface portion of the image,
    the second contrast being a contrast ratio of a color of the line identified from the selected candidate to an averaged color of the road-surface portion of the image.

15. The travelling road estimating method according to claim 13, wherein:
    the calculating step sets the reliability of the selected candidate to be higher with a decrease of at least one of a first contrast and a second contrast,
    the first contrast being a contrast ratio of a luminance level of a road-surface portion of the image at a boundary of a line identified from the selected candidate to an averaged luminance level of the road-surface portion of the image,
    the second contrast being a contrast ratio of a color of the road-surface portion of the image at the boundary of the line identified from the selected candidate to an averaged color of the road-surface portion of the image.

16. The travelling road estimating method according to claim 13, wherein:
    the at least one line candidate extracted by the candidate extracting step comprises a plurality of line candidates;
    the calculating step calculates the reliability of each of the line candidates, at least one of the line candidates being selected as the selected candidate; and
    the determining step comprises:
        determining whether there is at least one low-reliability line candidate in the line candidates within an allowable range defined around the selected candidate, the reliability of the at least one low-reliability line candidate being lower than a predetermined threshold; and
        determining that there is the unstable situation upon determination that there is at least low-reliability candidate in the line candidates within the allowable range defined around the selected candidate.

17. The travelling road estimating method according to claim 13, further comprising:
    generating an item of feature information indicative of a feature of a line identified from the selected candidate, wherein the determining step comprises:
  determining whether the generated item of the feature information is outside a predetermined acceptable range; and
  determining that there is the unstable situation upon determination that the generated item of the feature information is outside a predetermined acceptable range.

18. The travelling road estimating method according to claim 17, wherein:
  the generating step comprises:
    generating, if the line identified from the selected candidate is comprised of a plurality of line segments, an item of the feature information for each of the line segments as the item of the feature information; and
    calculating an average and a variation of the generated line segments; and
  the determining step comprises:
    determining whether at least one of the calculated average and the variation is equal to or more than a corresponding at least one feature threshold; and
    determining that there is the unstable situation upon determination that the at least one of the calculated average and the variation is equal to or more than the corresponding at least one feature threshold.

19. The travelling road estimating method according to claim 18, wherein:
  the line identified from the selected candidate is a dashed line comprised of the plurality of line segments; and
  the generating step generates, as the item of the feature information for each of the line segments, at least one of:
    a longitudinal length of the corresponding one of the line segments; and
    a length of each of intervals between the respective plurality of line segments.

20. The travelling road estimating method according to claim 17, wherein:
  the image is captured by the camera every predetermined processing cycle;
  the generator step comprises:
    generating the item of the feature information every predetermined processing cycle, the item of the feature information generated for a first processing cycle in the processing cycles being referred to as a first item, the item of the feature information generated for a second processing cycle in the processing cycles being referred to as a second item, the second processing cycle being next to the first processing cycle; and
    calculating an absolute value of a deviation of the second item of the feature information from the first item of the feature information; and
  the determining step comprises:
    determining whether the absolute value of the deviation of the second item of the feature information from the first item of the feature information is equal to or more than a predetermined sudden-change threshold; and
    determining that there is the unstable situation upon determination that the absolute value of the deviation of the second item of the feature information from the first item of the feature information is equal to or more than the predetermined sudden-change threshold.

21. The travelling road estimating method according to claim 20, wherein:
  the generating step generates, as the item of the feature information every predetermined processing cycle, a type of the line identified from the selected candidate, the type of the line identified from the selected candidate for a first processing cycle in the processing cycles being referred to as a first line type, the type of the feature information generated for a second processing cycle in the processing cycles being referred to as a second line type, the second processing cycle being next to the first processing cycle; and
  the determining step comprises:
    determining whether the second line type has been changed from the first line type; and
    determining that there is the unstable situation upon determination that the second line type has been changed from the first line type.

22. The travelling road estimating method according to claim 13, wherein:
  the image is captured by the camera every predetermined processing cycle,
  the travelling road estimating method further comprising:
  an ambient information generating step including:
    obtaining a luminance level around the road ahead of the vehicle every predetermined processing cycle, the luminance level around the road ahead of the vehicle for a first processing cycle in the processing cycles being referred to as a first luminance level, the luminance level around the road ahead of the vehicle for a second processing cycle in the processing cycles being referred to as a second luminance level, the second processing cycle being next to the first processing cycle; and
    calculating an absolute value of a luminance deviation of the second luminance level from the first luminance level,
  wherein the determining step comprises:
    determining whether the generated absolute value of the luminance deviation is equal to or more than a predetermined luminance threshold; and
    determining that there is the unstable situation upon determination that the absolute value of the luminance deviation is equal to or more than the predetermined luminance threshold.

23. The travelling road estimating method according to claim 13, wherein:
  the adjusting step changes a degree of adjustment of the response level of the filter as a function of at least one of a speed of the vehicle and the reliability of the selected candidate.

24. The travelling road estimating method according to claim 13, wherein the estimating step estimates the road parameter using a Kalman filter as the previously prepared filter.

* * * * *